United States Patent [19]

Shaturov et al.

[11] Patent Number: 4,606,684

[45] Date of Patent: Aug. 19, 1986

[54] METHOD FOR MACHINING BODIES OF REVOLUTION WITH USE OF ROTARY TOOL

[75] Inventors: Gennady F. Shaturov; Sergei S. Malyavko, both of Mogilev; Alexei M. Nadvikov, Moscow, all of U.S.S.R.

[73] Assignee: Mogilevskoe Otdelenie Fiziko-Teknicheskogo Instituta, Mogilev, U.S.S.R.

[21] Appl. No.: 466,867

[22] Filed: Feb. 16, 1983

[51] Int. Cl.[4] .......................... B23B 1/00; B23C 3/04
[52] U.S. Cl. ................................. 409/132; 82/1 C; 409/216; 409/228
[58] Field of Search ............. 409/132, 201, 204, 216, 409/228, 234; 82/1 C

[56] References Cited

U.S. PATENT DOCUMENTS

| 2,225,400 | 12/1940 | Kraus | 409/228 |
| 3,741,070 | 6/1973 | Berthiez | 409/132 |
| 4,177,699 | 12/1979 | Dovnar et al. | 409/132 X |
| 4,181,049 | 1/1980 | Borisenko et al. | 82/1 C |

*Primary Examiner*—Gil Weidenfeld
*Assistant Examiner*—Glenn L. Webb
*Attorney, Agent, or Firm*—Burgess, Ryan & Wayne

[57] ABSTRACT

A method for machining bodies of revolution with the use of a rotary cutting tool, characterized in that the angle of the cutting edge of the tool and the distance between the tool's axis of rotation and the base plane are selected so that the difference between the distances from the cutting edge points to the axis of the machine tool centers is equal to or greater than the amount of elastic deformation of the material being machined. The cutting edge points are found in a plane extending through the machine tool centers axis and the tool nose, on the opposite sides of the axis of rotation of the tool.

5 Claims, 5 Drawing Figures

METHOD FOR MACHINING BODIES OF REVOLUTION WITH USE OF ROTARY TOOL

FIELD OF THE INVENTION

The present invention relates to the machining of metals. More specifically, it is concerned with a method for machining bodies of revolution with the use of a rotary tool.

The invention is best applicable to the finish machining of calender rolls employed in the pulp and paper industry.

The invention is also applicable to the machining of metals and alloys, as well as to the turning of workpieces of non-metallic materials.

DEFINITION OF THE TERMS

For a full understanding of the invention, some of the basic terms used in this application disclosure have to be defined. The base plane is a plane extending through the axis of the machine tool centers parallel with the feed direction. The nose of the cutting edge of the tool is the point on the cutting edge, which is the closest to the axis of the machine tool centers. Points of the cutting edge are the cutting edge nose and a point on the plane extending through the axis of the machine tool centers and the cutting edge nose; this latter point will be subsequently referred to as the additional cutting edge point. The main portion of the cutting edge is that portion of the cutting edge which extends from the nose in the direction of the feed to as far as the extreme point of the cutting edge outside the machining zone. The secondary portion of the cutting edge is that portion of the cutting edge which extends from the nose in the direction opposite to that of the feed to as far as the extreme point of the cutting edge inside the machining zone.

BACKGROUND OF THE INVENTION

Machining with the use of rotary tools is done by cutting elements of the tool which have small angles, with the cutting edge viewed from the top, at the extreme points of the cutting edge just inside and outside the cutting zone, between which the active portion of the cutting edge is confined. The active portion of the cutting edge is, in turn, composed of two portions, namely, the main and secondary portions, which are divided by the nose of the cutting edge. The main portion of the cutting edge has a considerable length and removes a maximum amount of stock. In rotary tools, the active portion of the cutting edge is 4 to 8 times longer than that of conventional flat form tools designed for the same stock removal. The great length of the active portion accounts for great cutting forces. With great cutting forces, even minor deviations from the true geometrical shape of the workpiece lead to considerable fluctuations of the cutting force, especially at a perpendicular to the axis of rotation of the tool. Thus the cutting force is applied to a plane in which the rigidity of the tool is minimal. The result is vibration of the machine tool—fixture—cutting tool—workpiece system. Vibration has an adverse effect on the surface finish and puts limitations on the feed. These factors, in turn, reduce the efficiency of machining.

There is known a method for machining bodies of revolution with the use of a rotary tool having a circular cutting edge. The axis of rotation of the tool is in a plane parallel with the base plane extending through the axis of the machine tool centers. The plane of the cutting edge extends at an angle to the axis of the machine tool centers. The nose of the cutting edge is in a plane extending through the axis of the machine tool centers at an angle to the base plane. The tool is fed from the nose of the cutting edge towards the axis of its rotation.

Machining with a rotary tool produces a succession of microridges on the surface of the workpiece, whose height is in direct proportion with the roughness of that surface. The lateral surface of a microridge in the direction of the feed is formed by the secondary portion of the cutting edge which extends from the nose of the cutting edge in the direction opposite to that of the feed. The lateral surface of a microridge on the side opposite to the direction of the feed is formed by the main portion of the cutting edge extending from the nose of the cutting edge in the direction of the feed. The complete profile of a microridge is formed during two revolutions of the workpiece by portions of the cutting edge on the opposite sides of its nose. The length of the secondary portion of the cutting edge, which extends from the cutting edge nose in the direction opposite to that of the feed, does not exceed 8 percent of the length of the main portion which extends from the cutting nose of the cutting edge in the direction of the feed.

A rotary tool has cutting elements with a cutting edge radius greater by one or two orders of magnitude than the radius of the cutting edge at the nose of a conventional flat form tool. As a result of machining with a rotary tool, the surface finish is by one order of magnitude better than in the case of using a conventional flat form tool under the same conditions.

Increasing the feed leads to a greater height of the microridges and a greater length of the secondary portion of the cutting edge. This, in turn, increases the friction force applied to the cutting edge in the direction opposite to that of its rotation and reduces the speed of rotation. The result is a greater frequency of the tool vibration and greater roughness of the machined surface.

The machining method under review is disadvantageous in that a microridge is formed by a single active portion of the cutting edge, composed of the main and secondary cutting edge portions. The cutting edge has no portion to cut off the microridge formed by the active portion and thus improve the surface finish. Surface finish cannot be improved by increasing the amount of feed. There are no machining methods which would employ an additional cutting edge portion to remove stock and form microridges, with the active portion of the cutting edge flattening the microridges. Thus there are no methods of machining with the use of rotary tools which would guarantee good surface finish with great amounts of feed.

SUMMARY OF THE INVENTION

It is the principal object of the present invention to provide a method for machining bodies of revolution with the use of a rotary tool, which would guarantee good surface finish.

It is another object of the invention to provide a method for machining bodies of revolution with the use of a rotary tool, which would guarantee a high efficiency of the machining.

The invention provides a method for machining bodies of revolution with the use of a rotary tool having a circular cutting edge, carried out with the tool set so that its axis of rotation is in a plane parallel with the base plane extending through the axis of the machine tool centers, the plane of the cutting edge of the tool extending at an angle to the axis of the machine tool centers, the nose of the cutting edge being in a plane extending through the axis of the machine tool centers at an angle to the base plane, which method is characterized, according to the invention, in that the angle at which the cutting edge is set in relation to the axis of the machine tool centers, and the distance between the axis of rotation of the tool and the base plane are selected so that the difference between the distances from points of the cutting edge, found in the plane extending through the axis of the machine tool centers and the nose of the cutting edge on the opposite sides of the axis of rotation of the tool is equal to or greater than the amount of elastic deformation of the workpiece material caused by the machining.

With the feed directed from the axis of rotation of the tool towards the nose of the cutting edge, such a setting of the tool increases the secondary portion of the cutting edge, which is involved in the formation of microridges, and reduces the height of the microridges. It also ensures a contact between the workpiece and the cutting edge at a point found in the plane extending through the axis of the machine tool centers and the nose of the cutting edge. As a result, an auxiliary portion is produced on the cutting edge on the side opposite to that of the active portion in relation to the axis of rotation of the tool. This auxiliary portion extends in the direction opposite to that of the feed and is in contact with the workpiece. The auxiliary portion is composed of two portions, namely, a main auxiliary portion and a secondary auxiliary portion, which are divided by an additional point. The main and secondary auxiliary portions cut off the microridges produced by the main and auxiliary portions of the cutting edge, thus improving the surface finish. Depending on the amount of elastic deformation of the workpiece material caused by machining, the secondary portion and the main auxiliary portion of the cutting edge may form a continuous portion with the secondary auxiliary portion which forms and repeatedly cuts off microridges, thus improving the surface finish. This makes it possible to reduce the height of microridges 2- to 3-fold and raise the machining efficiency by increasing the amount of feed 3- to 4-fold, as compared with the amount of feed in the case of conventional methods for machining bodies of revolution with the use of rotary tools.

If the feed is directed from the nose of the cutting edge towards the axis of rotation of the tool, an auxiliary portion of the cutting edge is produced in that part of the cutting edge which is opposite to the active portion of the cutting edge in relation to the axis of rotation of the tool and extends in the direction of the feed. This auxiliary portion is close to the additional point of the cutting edge found in the plane extending through the axis of the machine tool centers and the nose of the cutting edge. The auxiliary portion is in contact with the workpiece. It is composed of two portions, namely, a main auxiliary portion and a secondary auxiliary portion, which are divided by the additional point. The main auxiliary portion of the cutting edge sharply reduces the maximum stock removal and extends from the additional point in the direction of the feed to as far as the extreme point of the cutting edge outside the machining zone. The secondary auxiliary portion of the cutting edge reduces the minimum stock removal and finishes the formation of microridges on the surface of the workpiece. The secondary auxiliary portion extends from the additional point in the direction opposite to that of the feed to as far as the extreme point of the cutting edge inside the machining zone. The active portion of the cutting edge, which is closer to the axis of the machine tool centers, completes the machining by cutting off the microridges formed by the auxiliary portion of the cutting edge and by compacting the surface of the workpiece. The method according to the invention makes it possible to make the surface finish one or two grades higher and increase the feed 3- to 5-fold, as compared with conventional methods of machining with the use of rotary tools.

It is preferable that the plane of the cutting edge of the rotary tool extend at an angle equal to or lesser than 1° in relation to the axis of the machine tool centers.

This makes it possible to increase the secondary portion of the cutting edge, which extends from the cutting edge nose in the direction opposite to that of the feed. Thus the length of the secondary portion may amount to at least 2 percent of the length of the main portion which extends from the cutting edge nose in the direction of the feed. The height of microridges is reduced by bringing the cutting edge as close as possible to the surface of the workpiece. This facilitates the subsequent cutting of microridges by the auxiliary portion of the cutting edge and improves surface finish.

If the feed is directed from the nose of the cutting edge towards the axis of rotation of the tool, setting the plane of the cutting edge at an angle equal to or lesser than 1° with respect to the axis of the machine tool centers makes it possible to increase the secondary auxiliary portion of the cutting edge to at least 20 percent of the length of the main auxiliary portion of the cutting edge. As microridges are being formed by the auxiliary portion of the cutting edge, their height is reduced by bringing the cutting edge as close to the surface of the workpiece as possible. An increased length of the active portion of the cutting edge reduces the time during which microridges are cut by the active portion. The surface finish is further improved by the auxiliary portion of the cutting edge, which also compacts the surface of the workpiece.

The best surface finish is obtained when the distance between the points of the cutting edge on the opposite sides of the axis of rotation of the tool, one of which points is the nose, is equal to one half of the amount of feed multiplied by an odd number. In this case the points of the cutting edge, one of which is the nose and the other is an additional point of the cutting edge, move along different paths. If the feed is directed away from the axis of rotation of the tool towards the nose, the additional point of the cutting edge, which separates the main and auxiliary secondary portions of the cutting edge, eliminates the microridges left after machining by the active portion of the cutting edge. The use of the auxiliary portion of the cutting edge for cutting the microridges improves the surface finish.

If the feed is directed away from the nose towards the axis of rotation of the tool, the nose of the cutting edge, which separates the main and auxiliary portions of the cutting edge, eliminates the microridges left after machining by the auxiliary portion of the cutting edge. Apart from cutting the microridges, the surface of the workpiece is compacted, whereby the surface finish is improved.

It is expedient that the distance H between the axis of rotation of the tool and the base plane, which extends through the axis of the machine tool centers, and the angle $\phi$ at which the cutting edge of the tool is set are selected on the basis of the following equation:

$$H = \frac{1}{2}\left( D\frac{\sin\phi}{\sqrt{\tan^2\frac{\alpha}{2} + \sin^2\phi}} + d\cos\frac{\alpha}{2} \right),$$

where
D is the diameter of the machined workpiece,
d is the diameter of the circular cutting edge of the tool, and
$\alpha$ is the center angle between the points of the cutting edge on the opposite sides of the axis of rotation of the tool in the plane extending through the axis of the machine tool centers and the nose of the cutting edge.

The distance H between the axis of rotation of the tool and the base plane can thus be selected by appropriately positioning the nose and the additional point of the cutting edge and by appropriately setting the cutting edge plane at a desired angle $\phi$ with respect to the axis of the machine tool centers. By correctly selecting the distance H, it is possible to optimize the length of the cutting edge portions involved in eliminating microridges. This, in turn, optimizes the surface finish and reduces the tool adjustment and readjustment time, whereby the overall efficiency is increased.

BRIEF DESCRIPTION OF THE ATTACHED DRAWINGS

Other objects and advantages of the present invention will become more apparent from a consideration of the following detailed description of preferred embodiments thereof, taken in conjunction with the accompanying drawings, wherein:

FIG. 5 is a view taken in the direction of the arrow B in FIG. 3, showing microridges and the amount of elastic deformation of the workpiece material caused by machining.

DETAILED DESCRIPTION OF THE INVENTION

Figure 1:
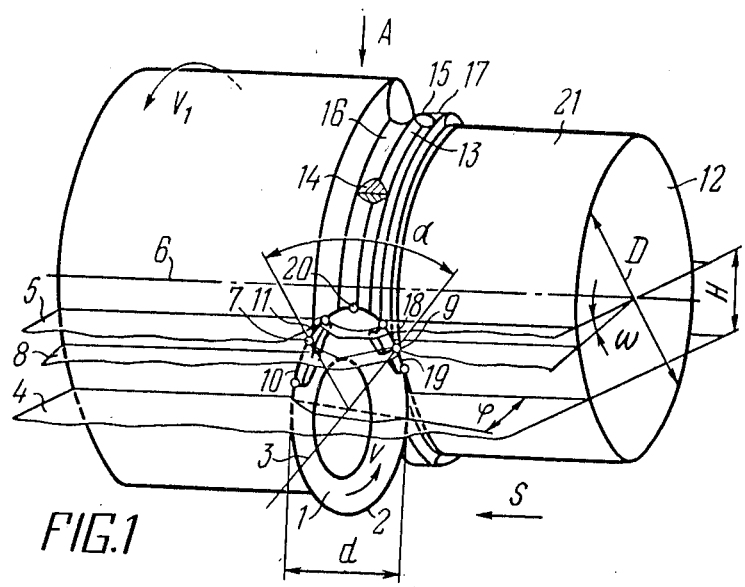
FIG. 1 is an illustration of the way the method according to the invention for machining bodies of revolution with the use of a rotary tool is caried out with the feed directed away from the axis of rotation of the tool towards the tool nose.

The invention provides a method for machining bodies of revolution with the use of a rotary tool 1 (FIG. 1) having a circular cutting edge 2. According to this method, the tool 1 is set so that its axis 3 of rotation extends in a plane 4 parallel with a base plane 5 extending through the axis 6 of the machine tool centers. The plane of the cutting edge 2 of the tool 1 is set at an angle $\phi$ to the axis 6 of the machine tool centers. A nose 7 of the cutting edge 2 of the tool 1 is in a plane 8 extending through the axis 6 of the machine tool centers at an angle $\omega$ to the base plane 5. According to the invention, the angle $\phi$ at which the plane of the cutting edge 2 of the tool 1 is set in relation to the axis 6 of the machine tool centers, and the distance H between the axis 3 of rotation of the tool 1 and the base plane 5 are selected so that the difference $l_1 - l_2$ (FIG. 2) between the distances from points 7 and 9 of the cutting edge 2 to the axis 6 of the machine tool centers is equal to or greater than the amount $\Delta$ of elastic deformation of the workpiece material caused by machining, i.e., $l_1 - l_2 \geq \Delta$. One of said points is the nose 7, while the point 9 is an additional point of the cutting edge 2 of the tool 1. The points 7 and 9 are found in the plane 8 (FIG. 1) extending through the axis 6 of the machine tool centers and the nose 7 of the cutting edge 2 of the tool 1, on the opposite sides of the axis 3 of rotation of the tool 1. The feed S of the tool 1 is directed away from the axis 3 of rotation of said tool 1 towards the nose 7. The nose 7 of the cutting edge 2 of the tool 1 divides the active portion of the cutting edge 2 into a main portion 10 and a secondary portion 11. The main portion 10, extending from the nose 7 in the direction of the feed S, removes a maximum of stock from the workpiece 12 and forms a lateral side 13 of a microridge 14, which lateral side 13 extends from an apex 15 of the microridge 14 in the direction opposite to that of the feed S. The secondary portion 11 of the cutting edge 2 of the tool 1 extends from the nose 7 in the direction opposite to that of the feed S. The portion 11 removes a minimum of stock from the workpiece 12 and completes the formation of the microridge 14 by forming its second lateral surface 16 extending from the apex 15 in the direction of the feed S. The additional point 9 of the cutting edge 2, which is in the plane 8 extending through the axis 6 of the machine tool centers and the nose 7 of the cutting edge 2, is in contact with a surface 17 of the workpiece 12 previously machined by the active portion of the cutting edge 2. The surface 17 is shown by a thin line in FIG. 1. The distance $l_1$ between the point 9 and the axis 6 of the machine tool centers is greater than the distance $l_2$ between the axis 6 of the machine tool centers and the nose 7 of the cutting edge 2. The difference between $l_1$ and $l_2$ is equal to the amount of elastic deformation of the workpiece material caused by machining, i.e., $l_1 - l_2 = \Delta$. As a result, a main auxiliary portion 18 and a secondary auxiliary portion 19 are produced on the auxiliary portion of the cutting edge 2 extending on the opposite side of the active portion of the cutting edge 2 with respect to the axis of rotation 3 of the tool 1 in the direction opposite to that of the feed S. The portions 18 and 19 are divided by a point matched with the additional point 9 of the cutting edge 2. The portions 18 and 19 are in contact with the surface 17 of the workpiece 12 previously machined by the active portion of the cutting edge 2. The main auxiliary portion 18 of the cutting edge 2 extends away from the additional point 9 and from the secondary auxiliary portion 19 of the cutting edge 2 in the direction of the feed S to as far as the extreme point of the cutting edge 2 outside the surface 17 previously machined by the active portion of the cutting edge 2. The secondary auxiliary portion 19 of the cutting edge 2 extends away from the additional point 9 and from the main auxiliary portion 18 in the direction opposite to that of the feed S to as far as the extreme point of the cutting edge inside the machining zone. If the tool 1 is set so that the difference ($l_1-l_2$) between the distances from the points 7 and 9 of the cutting edge 2 to the axis 6 of the machine tool centers is greater than the amount $\Delta$ of elastic deformation of the workpiece material caused by machining, i.e., $l_1-l_2 > \Delta$, the auxiliary portion of the cutting edge 2 is displaced upwards along the cutting edge 2 in the direction of the feed S. The point that separates the main auxiliary portion 18 from the secondary auxiliary portion 19 is again that point of the cutting edge 2 which is spaced from the axis 6 of the machine tool centers at a distance equal to the amount of elastic deformation of the workpiece material caused by machining. In this case the point which divides the portion 18 and the portion 19 is not matched with the additional point 9 of the cutting edge 2; the dividing point is above the plane 8. It must be noted that with displacements H>d/4 of the axis 3 of rotation of the tool 1 from the base plane 5, with small angles $\phi$ at which the plane of the cutting edge 2 extends with respect to the axis 6 of the machine tool centers, and with a great amount $\Delta$ of elastic deformation of the workpiece material caused by machining, the main auxiliary portion 18 follows immediately after the secondary portion 11 of the cutting edge 2. There is no discontinuity between the portions 18 and 11 which are divided by a point 20 on the cutting edge 2. The point 20 is located symmetrically with respect to the points 7 and 9 of the cutting edge 2, which are in the plane 8 extending through the axis 6 of the machining tool centers and the nose 7 of the cutting edge 2. The point 20 divides the cutting edge 2 into two parts with respect to the axis 3 of rotation of the tool 1. The first of these parts extends in the direction of the feed S, while the second extends in the opposite direction.

Figure 2:
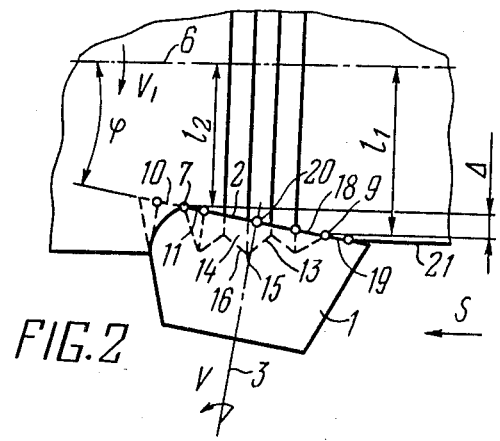
FIG. 2 is a view taken in the direction of the arrow A in FIG. 1, showing microridges and the amount of elastic deformation of the workpiece material caused by machining.

The plane of the cutting edge 2 extends at an angle $\phi$ in relation to the axis 6 of the machine tool centers (FIG. 2). The angle $\phi$ is equal to or lesser than 1°. Thus the cutting edge 2 is brought as close as possible to a surface 21 of the workpiece 12 and to the axis 6 of the machine tool centers. This increases the length of the secondary portion 11 of the cutting edge 2, which completes the formation of the microridge 14 and reduces its height. The length of the secondary portion 11 amounts to at least 20 percent of the length of the main portion 10. Reducing the height of the microridge 14 during its formation reduces the amount of time required for its complete elimination by the auxiliary portion of the cutting edge 2 and accounts for a longer period of time during which the workpiece is finish-machined by the same portion of the cutting edge 2. The result is a better finish of the surface 21. Setting the plane of the cutting edge 2 at an angle $\phi$ equal to or lesser than 1° increases the length of the auxiliary portion of the cutting edge 2. As a result, the auxiliary portion of the cutting edge 2 repeatedly cuts the microridge 14, reducing its height. This accounts for longer finish-machining of the surface 21 of the workpiece 12, whereby the surface finish is further improved.

The distance l between the points 7 and 9 (FIG. 3) of the cuttinge edge 2, which points 7 and 9 are on the opposite sides of the axis 3 of rotation of the tool 1 with the point 7 being its nose, is equal to one half of the feed S multiplied by an odd number N, i.e., $l=S/2\cdot N(1)$, where N is an odd number (N = 1, 3, 5, 7, 9, 11 ...).

If the feed is directed away from the axis 3 of rotation of the tool 1 towards its nose 7, the additional point 9 of the cutting edge 2, matched with $l_1-l_2=\Delta$ (FIG. 3) with the point dividing the main auxiliary portion 18 and the secondary auxiliary portion 19 of the cutting edge 2, is roughly in the middle of the microridge 14 formed by the active portion of the cutting edge 2. The result is maximum cutting of the microridge 14 by the cutting edge 2, which improves the finish of the machined surface 21.

The distance H between the axis 3 of rotation of the tool 1 and the base plate 5 which extends through the axis 6 of the machine tool centers, and the angle $\phi$ at which the plane of the cutting edge 2 extends in relation to the axis 6 of the machine tool centers are selected on the basis of the following equation:

$$H = \frac{1}{2}\left( D\frac{\sin\phi}{\sqrt{\tan^2\frac{\alpha}{2} + \sin^2\phi}} + d\cos\frac{\alpha}{2} \right) \quad (2)$$

where

D is the diameter of the machined workpiece 12, d is the diameter of the circular cutting edge 2 of the tool 1, and $\alpha$ is the center angle between the points 7 and 9 of the cutting edge 2, found on the opposite sides of the axis 3 of rotation of the tool 1 in the plane 8 extending through the axis 6 of the machine tool centers and the nose 7 of the cutting edge 2.

The above equation makes it possible to accurately set the distance H between the axis 3 of rotation of the tool 1 and the base plane 5 in order to set the tool 1 for new machining conditions on the basis of the known optimum parameters, including the angle $\phi$ at which the plane of the cutting edge 2 is set in relation to the axis 6 of the machine tool centers, and the angle $\alpha$ between the points 7 and 9 of the cutting edge 2, which points 7 and 9 are in the plane 8 extending through the axis 6 of the machine tool centers and the nose 7 of the cutting edge 2. This reduces the time required to reset the tool 1 for new operating conditions, improves the efficiency, and ensures excellent surface finish.

Figure 4:
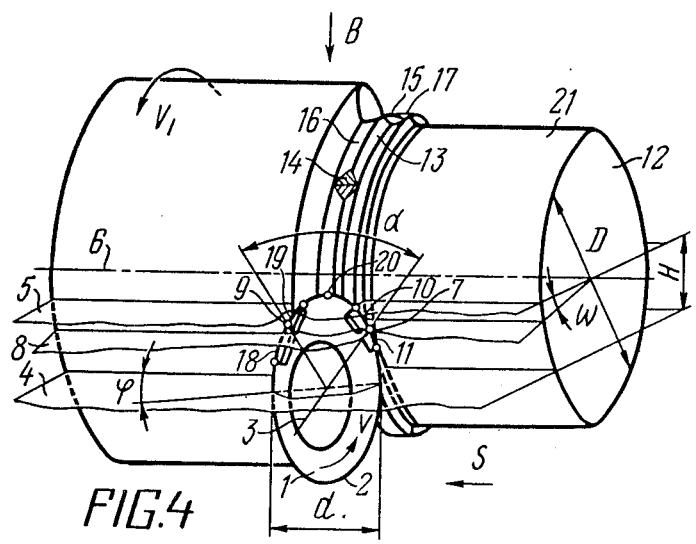
FIG. 4 is an illustration of the way the method according to the invention for machining bodies of revolution with the use of a rotary tool is carried out with the feed directed away from the tool nose towards the axis of rotation of the tool.
Figure 5:
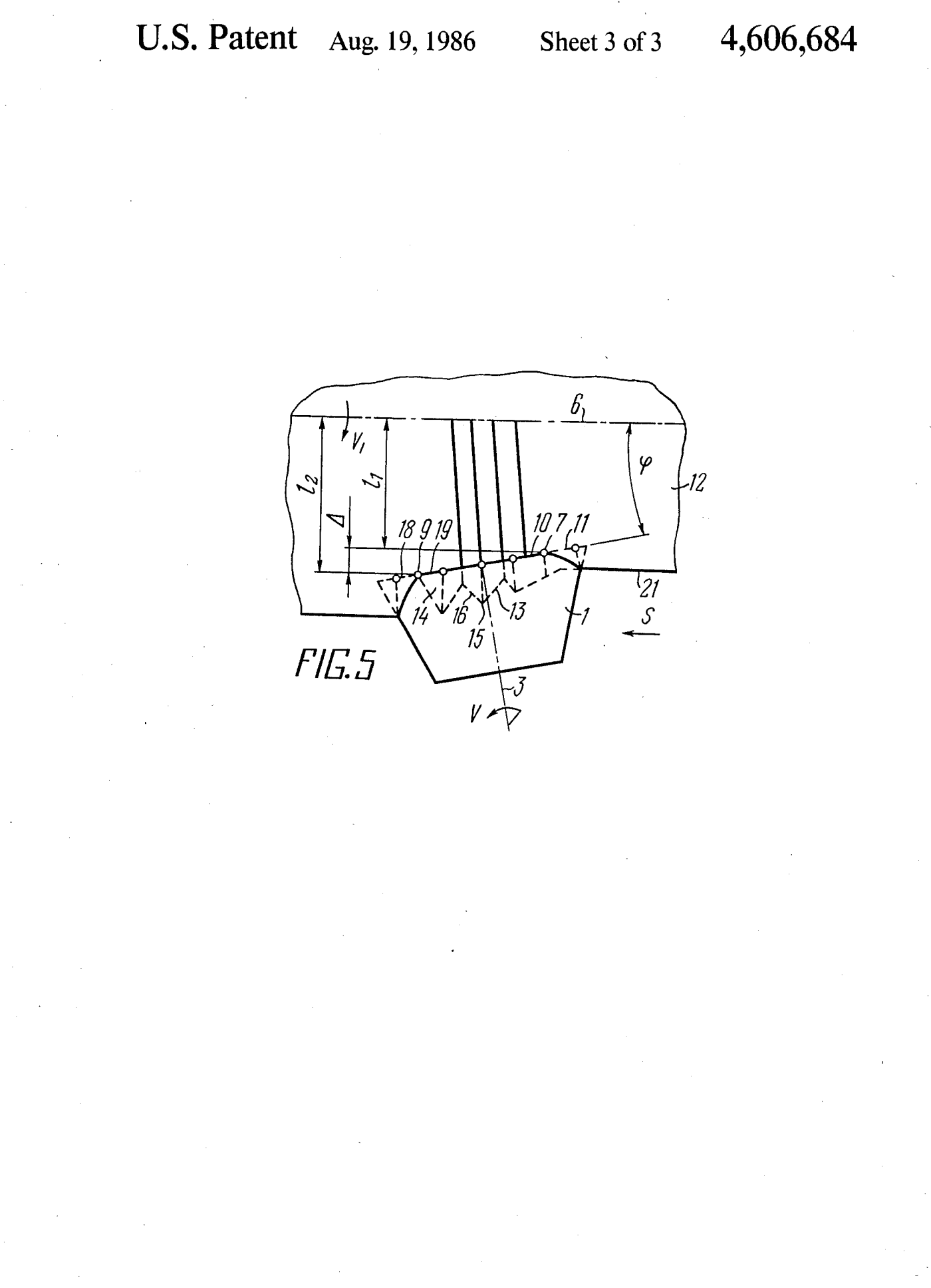

According to an alternative embodiment of the invention, illustrated in FIGS. 4 and 5, the feed S is directed from the nose 7 of the cutting edge 2 towards the axis 3 of rotation of the tool 1.

In this case an auxiliary portion of the cutting edge 2 is produced in the area of the point 9 which is found in the plane 8 extending through the axis 6 of the machine tool centers and the nose 7 of the cutting edge 2. The auxiliary portions consists of the main auxiliary portion 18 and the secondary auxiliary portion 19. The main auxiliary portion 18, which extends from the additional point 9 in the direction of the feed S to as far as the point of the cutting edge 2 outside the machining zone, removes a maximum amount of stock from the workpiece 12 and forms the lateral surface 13 of the microridge 14, extending from the apex 15 of the microridge 14 in the direction opposite to that of the feed S. The secondary auxiliary portion 19, extending from the additional point 9 in the direction opposite to that of the feed S to as far as the extreme point of the cutting edge 2 inside the machining zone, removes a minimum of stock from the workpiece 12 and completes the formation of the microridge 14 by forming its second lateral side 16 which extends from the apex 15 in the direction opposite to that of the feed S. The nose 7 of the cutting edge 2 is closer to the axis 6 of the machine tool centers than the additional point 9 by a value equal to or greater than the amount Δ of elastic deformation of the workpiece material caused by machining. The nose 7 divides the active portion of the cutting edge 2 into the main portion 10 and the secondary portion 11. The main portion 10 extends from the nose 7 in the direction of the feed S to as far as the point of the cutting edge 2 outside the surface 17 shown by a thin line in FIG. 4. The secondary portion 11 of the cutting edge 2 extends from the nose 7 in the direction opposite to that of the feed S to as far as the point of the cutting edge 2 inside the machining zone. The active portion of the cutting edge 2, which is closer to the axis 6 of the machine tool centers, cuts the microridges 14 produced by the auxiliary portion of the cutting edge 2. The extreme points of the active portion of the cutting edge 2 inside and outside the machining zone are farther from the axis 6 of the machine tool centers than the nose 7. The distance between the nose 7 and the axis 6 of the machine tool centers is $l_1$; the distance between the axis 6 of the machine tool centers and the additional point 9 of the cutting edge 2 is $l_2$; $l_1$ is Δ less than $l_2$, Δ being equal to the amount of elastic deformation of the workpiece material caused by machining. In other words, $l_2 - l_1 \geq \Delta$. Thus it is possible to select the amount of elastic deformation of the workpiece material for the extreme points of the active portion of the cutting edge 2. As a result, the microridge 14 is cut by the entire active portion of the cutting edge 2, the surface of the workpiece is compacted, and optimum surface finish is guaranteed.

By setting the plane of the cutting edge 2 of the tool 1 at an angle φ, which is equal to or lesser than 1°, with respect to the axis 6 of the machine tool centers and by feeding the tool 1 away from the nose 7 towards the axis 3 of its rotation, the cutting edge 2 is brought as close as possible to the surface of the workpiece 12. This increases the secondary auxiliary portion of the cutting edge 2 so that the length of this portion amounts to at least 20 percent of the length of the main auxiliary portion of the cutting edge 2. This also reduces the height of the microridge 14 as it is formed by the auxiliary portion of the cutting edge 2, and reduces the time during which the microridge 14 is eliminated by the active portion of the cutting edge 2. Setting the plane of the cutting edge 2 at an angle φ equal to or lesser than 1° to the axis 6 of the machine tool centers increases the length of the active portion of the cutting edge 2 so that the active portion 10 repeatedly cuts the microridge 14. As a result, the surface 21 of the workpiece 12 is finish-machined during a longer period of time. The surface 21 is compacted and given an excellent finish.

Making the angle φ greater than 1° is not recommended, because while cutting the microridge 14 previously produced by the auxiliary portion of the cutting edge 2, the active portion of the cutting edge 2 produces a new microridge 14, which mars the job.

If the condition (1) is complied with and if the feed is directed away from the nose 7 towards the axis 3 of rotation of the tool 1, the nose 7 of the cutting edge 2 is found roughly in the middle of the microridge 14 previously formed by the auxiliary portion of the cutting edge 2. As a result, the microridge 14 is cut by the entire cutting edge 2, the surface 21 is compacted, and good surface finish is guaranteed.

Figure 3:
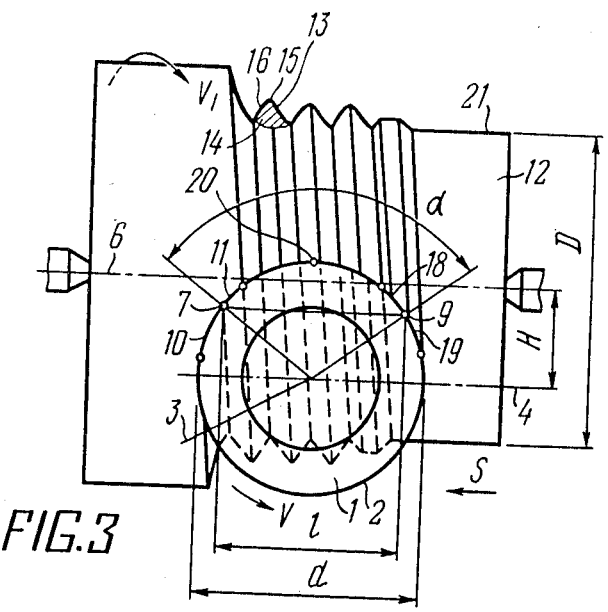
FIG. 3 is a schematic illustration of the way microridges are removed by the cutting edge of the rotary tool.

In the case of the auxiliary portion of the cutting edge 2, the feed is away from the axis 3 of rotation of the tool 1 and towards the nose 7 (FIG. 1). In the case of the active portion of the cutting edge 2, the feed is away from the nose 7 and towards the axis 3 of rotation of the tool 1 (FIG. 3). As these portions of the cutting edge 2 remove the microridge 14 from the surface 21 of the workpiece 12, the vector of the speed V of rotation of the cutting edge 2 runs counter and at an angle to the vector of the speed $V_1$ of rotation of the workpiece. As a result, the true speed vector, which is the sum total of the two above-mentioned vectors, is almost a tangent to the cutting edge 2. This makes the cutting edge 2 sharper and ensures a complete removal of the microridge 14 from the surface 21 of the workpiece 12.

What is claimed is:

1. A method for machining a workpiece comprising a body of rotation, having a diameter D, with a machine tool having a rotary cutting tool, the workpiece having an axis of rotation about which it rotates and a base plane extending through the axis of rotation of the workpiece, the rotary cutting tool contacting the workpiece and having an axis of rotation, a circular cutting edge having a diameter d, a nose on said cutting edge, and points on said cutting edge, found in a plane extending through said axis of rotation of the workpiece and said nose of said cutting edge, said points being on opposite sides of said axis of rotation of said cutting tool, which comprises: setting said axis of rotation of said cutting tool in a plane parallel with said baseplane of the machine tool, said parallel plane being at a distance H from said base plane not greater than d/2, the plane of said cutting edge being set at an angle φ to said axis of rotation of the workpiece, said nose of said cutting edge being in a plane extending through said axis of rotation of the workpiece at an angle to said base plane, wherein the angle φ at which said plane of said cutting edge is set in relation to said axis of rotation of the workpiece and the distance H between said plane of said axis of rotation of said tool and said base plane is selected so that the difference between the distances from said points on said cutting edge to said axis of rotation of the workpiece is equal to or greater than the amount of elastic deformation of the workpiece material caused by machining and wherein it is determined by the relation $$H = \frac{1}{2}\left( D \frac{\sin\phi}{\sqrt{\tan^2\frac{\alpha}{2} + \sin^2\phi}} + d \cos\frac{\alpha}{2} \right)$$

wherein α is the center angle between the points of the cutting edge formed on the opposite sides of the axis of rotation of the tool in the plane extending through the axis of rotation of the workpiece and the nose of the cutting edge; D is the diameter of the machined workpiece and d is the diameter of the circular cutting edge of the tool.

2. A method as claimed in claim 1, according to which the plane of the cutting edge of the rotary tool is set in relation to the axis of rotation of the workpiece at an angle α of 1°.

3. A method as claimed in claim 1, according to which the plane of the cutting edge of the rotary tool is set in relation to the axis of rotation of the workpiece at an angle α of less than 1°.

4. A method as claimed in claim 1, according to which the distance between the points on the cutting edge, which points are on the opposite sides of the axis of rotation of the tool, one of said points being the tool nose, is equal to one half of the amount of feed multiplied by an odd number.

5. An article prepared by the method of claim 1.

* * * * *